United States Patent Office 3,641,074
Patented Feb. 8, 1972

3,641,074
CARBONYLATION OF OLEFINS
Donald M. Fenton, Anaheim, Calif., assignor to Union Oil Company of California, Los Angeles, Calif.
No Drawing. Continuation-in-part of application Ser. No. 715,169, Mar. 22, 1968. This application Feb. 25, 1969, Ser. No. 802,218
Int. Cl. C11c 3/02
U.S. Cl. 260—410.9
13 Claims

ABSTRACT OF THE DISCLOSURE

A process for preparation of carboxylic acids, esters or anhydrides having a high ratio of normal to iso compounds comprising contacting an olefin and carbon monoxide with water, an organic acid or an alcohol under liquid phase conditions in the presence of a Group VIII noble metal in complex association with a biphyllic ligand at temperatures between 30° and 300° C. and at pressures sufficient to maintain liquid phase conditions. The catalyst is maintained in a form selective for the formation of normal or straight chained products by performing the reaction in the presence of hydrogen and/or by limiting the mineral acid content of the reaction medium, preferably to an equal molar ratio with the Group VIII noble metal.

DESCRIPTION OF THE INVENTION

This application is a continuation-in-part of application Ser. No. 715,169, filed Mar. 22, 1968, now abandoned.

The invention relates to a carbonylation process for the production of carboxylic acids, esters or anhydrides from olefins, carbon monoxide and water, an alcohol or an acid.

It is known that olefins can be carbonylated in liquid phase reactions using a catalyst comprising a palladium salt in complex association with a phosphine biphyllic ligand, e.g., triphenylphosphine. This reaction, however, generally has a relatively low reactivity and produces acids, esters or anhydrides having a high content of the iso or branched chain compounds. Since the straight chain compounds are generally the most useful product, being employed in the preparation of plasticizers, ester solvents, detergents, etc., it is desirable to provide a process that produces a higher yield of the normal or straight chain compounds.

In Netherlands Pat. No. 6409121 to Badische Anilin and Soda-Fabrik A.G., it is disclosed that the carbonylation proceeds in the presence of divalent palladium in complex with triphenylphosphine and in the presence of hydrochloric acid, the acid content being up to 10 percent of the liquid medium. The products of that carbonylation are, however, principally branched chain (e.g., normal to iso ratios of about 0.5). The process hereindescribed produces substantially less branched chain compounds than that described in the above-mentioned patent by performing the reaction in the presence of hydrogen and/or by adding an "acid acceptor," e.g., lithium acetate, to the reaction medium which unexpectedly enhances the selectivity of the complex catalyst to produce the more valuable and desirable straight chain products.

It is therefore an object of this invention to provide a carbonylation reaction that produces carboxylic acids, esters or anhydrides having a high concentration of the normal or straight chain compounds.

It is also an object of this invention to provide a highly reactive system for the carbonylation of olefins.

Other and related objects will be apparent from the following description of the invention.

The carbonylation of the invention proceeds generally as follows:

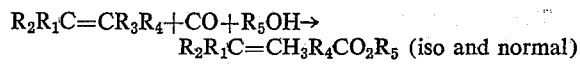
$R_2R_1C=CH_3R_4CO_2R_5$ (iso and normal)

It is apparent that when $R_5$ is hydrogen, a carboxylic acid is formed; when $R_5$ is acyl (e.g., $CH_3C=O$), an anhydride is formed; and when $R_5$ is alkyl, an ester is obtained.

The reactant olefinic compound may be any ethylenically unsaturated hydrocarbon having from 2 to about 25 carbons, preferably from 2 to about 15 carbons. The ethylenically unsaturated compound has the following general structure:

wherein $R_1$, $R_2$, $R_3$ and $R_4$ are hydrogen or the same or different alkyl, cycloalkyl, aryl, alkaryl, aralkyl or wherein one of said $R_1$ and $R_2$ and one of said $R_3$ and $R_4$ together form a single alkylene group having from 2 to about 8 carbons.

Examples of useful ethylenically unsaturated hydrocarbons are ethylene, propylene, butene-1, butene-2, 2-methylbutene-1, cyclobutene, hexene-1, hexene-2, cyclohexene, 3-ethylhexene-1, isobutylene, octene-1 2-methylhexene-1, ethylcyclohexene, decene-1, cycloheptene, cyclooctene, cyclononene, 3,3'-dimethylnonene-1, dodecene-1, undecene-3, 6-propyldecene-1, tetradecene-2, 3-amyldecene-1, oligomers of olefins such as propylene tetramer, ethylene trimer, etc., hexadecene-1, 4-ethyltridecene-1, octadecene-1, 5,5-dipropyldodecene-1, vinylcyclohexane, allylcyclohexane, styrene, p-methylstyrene, alpha-methylstyrene, p-vinylcumene, beta-vinylnaphthalene, 1,1 - diphenylethylene, allylbenzene, 6-phenylhexene-1, 1,3-diphenylbutene-1, 3-benzylheptene-1, divinylbenzene, 1-allyl-3-vinylbenzene, etc. Of the preceding the alpha hydrocarbon olefins and olefins having 2 to about 8 carbons are preferred, e.g., ethylene, propylene, butene-1, hexene-1, heptene-1, octene-1, etc.

The olefin is reacted with carbon monoxide and with water, an acid or an alcohol to yield an acid, an anhydride or an ester, respectively. For example, when the olefin is reacted with carbon monoxide and water a mixture of the straight chain and branched chain acids is formed:

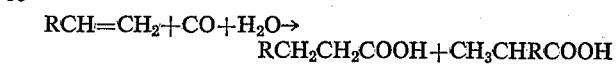

For production of esters, an alcohol is included in the reaction medium and the reaction proceeds as follows:

The reactant alcohol may be in general any alcohol having the formula:

wherein R is alkyl, cycloalkyl, aryl, alkaryl or aralkyl or mixtures thereof; preferably R has 1 to about 18 carbons and most preferably R is alkyl having 1 to about 12 carbons, e.g., methyl, ethyl, propyl, butyl, isobutyl, pentyl, hexyl, nonyl, etc. or is aralkyl with 7 to about 14 carbons, e.g., benzyl, phenethyl, etc.

Examples of suitable alcohols include methanol, ethanol, isopropanol, propanol, butanol, tertiary butanol, pentanol, hexanol, 2-ethylhexanol, octanol, decanol, 6-pentadecanol, cyclopentanol, methylcyclopentanol, cyclohexanol, benzyl alcohol, α,α-dimethylbenzyl alcohol, α-ethylphenethyl alcohol, naphthyl carbinol, xylyl carbinol, tolyl carbinol, etc.

For production of anhydrides a carboxylic acid is included in the reaction medium and the reaction proceeds as follows:

RCH=CH₂ + CO + R″COOH ⟶

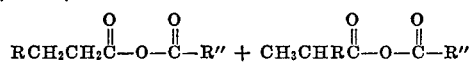

The reactant carboxylic acid may be in general any carboxylic acid having 1 to about 25 carbons and having the formula:

RCOOH wherein R is hydrogen, alkyl, cycloalkyl or aryl. Preferably R has 1 to about 18 carbons and most preferably R is alkyl having 1 to about 12 carbons, e.g., methyl, ethyl, propyl, isobutyl, hexyl, nonyl, etc. or is aryl with 6 to about 9 carbons, e.g., phenyl, tolyl, etc.

Examples of useful acids are formic, acetic, propionic, n-butyric, isobutyric, pivalic, n-valeric, n-caproic, caprylic, capric, decanoic, myristic, palmitic, naphthoic, stearic, benzoic, phthalic, terephthalic, toluic, 3-phenylhexanoic acid, 2-xylylpalmitic acid and 4-phenyl-5-isobutyl stearic acid. The preferred acids are the fatty or alkanoic acids having 2 to about 12 carbons, e.g., acetic, propionic, n-butyric, isobutyric, pivalic, caproic, undecylic, etc.

The catalyst of the invention comprises a Group VIII noble metal in complex association with a biphyllic ligand. The biphyllic ligand is a compound having at least one atom with a pair of electrons capable of forming a coordinate covalent bond with a metal atom and simultaneously having the ability to accept the electron from the metal, thereby imparting additional stability to the resulting complex. Biphyllic ligands can comprise organic compounds having at least about 3 carbons and containing arsenic, antimony, phosphorus or bismuth in a trivalent state. Of these the phosphorus compounds, i.e., the phosphines, are preferred; however, the arsines, stibines and bismuthines can also be employed. In general these biphyllic ligands have the following structure:

E(R)₃ wherein E is trivalent phosphorus, arsenic, antimony or bismuth; and
wherein R is the same or different alkyl, cycloalkyl, or aryl group having 1 to about 18 carbons, examples of which are methyl, butyl, nonyl, cyclohexyl, cyclodecyl, phenyl, tolyl, xylyl, duryl, etc. Preferably at least one R is aryl, e.g., phenyl, tolyl, xylyl, etc. having 6 to 9 carbons and, most preferably, the ligand is triaryl.

Examples of suitable biphyllic ligands having the aforementioned structure and useful in my invention to stabilize the catalyst composition are the following:

trimethylphosphine,
triethylarsine,
triethylbismuthine,
triisopropylstibine,
dioctylcycloheptylphosphine,
tricyclohexylphosphine,
ethyldiisopropylstibine,
tricyclohexylphosphine,
methyldiphenylphosphine,
methyldiphenylstibine,
triphenylphosphine,
triphenylbismuthine,
tri(o-tolyl)phosphine,
ethyldiphenylphosphine,
phenylditolylphosphine,
phenyldiisopropylphosphine,
phenyldiamylphosphine,
xylyldiphenylarsine,
tolyldi(m-xylyl)stibine,
trixylylphosphine,
trixylylarsine,
trixylylstibine,
cyclopentyldixylylstibine,
dioctylphenylphosphine,
tridurylphosphine,
tricumenylphosphine,
trixylylbismuthine, etc.

Of the aforementioned, the aryl phosphines and particularly the triarylphosphines (e.g., triphenylphosphine) are preferred because of their greater activity.

The Group VIII noble metal may be ruthenium, rhodium, palladium, osmium, iridium or platinum and is preferably palladium due to its greater activity. A catalytic quantity of the metal is added (e.g., 0.002–2% of the reaction medium) and the metal may be added as a soluble salt, a carbonyl, a hydride or as a chelate.

The Group VIII noble metal may be complexed with the above-described biphyllic ligand before being introduced into the reaction medium or the complex may be formed "in situ" by simply adding a compound of the metal and the biphyllic ligand directly into the reaction medium. In either case, it is generally preferable that the quantity of biphyllic ligand be in excess (e.g., 10–300% of that stoichiometrically required to form a complex with the Group VIII metal). The complex has from 1 to about 5 moles of biphyllic ligand per atom of the metal and other components such as hydride, or soluble anions such as sulfate, nitrate, C₁–C₅ carboxylates (e.g., acetate, propionate, isobutyrate, valerate, etc.), halide, etc. may be but need not be included in the complex catalyst of this invention. These components may be incorporated in the catalyst by the formation of the catalyst complex from a Group VIII noble metal salt of the indicated anions. A preferred complex is one comprising at least one halide ligand, e.g., chloride, iodide or bromide, or at least one C₁–C₅ carboxylate, e.g., acetate, propionate, butyrate, etc., since these groups, particularly halide, have been shown to improve the activity of the catalyst.

Examples of suitable sources of the noble metals are as follows: iridium carbonyl chloride, iridium carbonyl hydride, iridium carbonyl, iridium tetrabromide, iridium tribromide, iridium trifluorde, iridium trichloride, osmium trichloride, chloroosmic acid, palladium hydride, palladous chloride, palladous cyanide, palladous iodide, osmium isopropionate, iridium valerate, palladium acetate, palladous nitrate, platinic acid, platinous iodide, palladium cyanide, sodium hexachloroplatinate, potassium trichloro(ethylene)platinate(II), chloropentaaminonorhodium (III) chloride, rhodium dicarbonyl chloride dimer, rhodium nitrate, rhodium trichloride, rhodium carbonyl hydride, ruthenium trichloride, tetraaminorutheniumhydroxychloro chloride; etc. Generally the halide salt and particularly the chloride salt are preferred sources of the Group VIII noble metal (e.g., palladium chloride, rhodium chloride, etc.). It is preferred that the source of the Group VIII noble metal be one wherein the anion to metal ratio is 2 or less, e.g., palladium chloride, rhodium nitrate, platinous iodide, etc.

The reaction is performed under liquid phase conditions and can be conducted in the presence of a suitable inert organic liquid which is a solvent for the reactants and catalyst and inert to the reactants, products, catalyst under the reaction conditions.

The choice of the particular solvent depends of course on which one of the above three carbonylation processes is employed.

For production of acids suitable solvents include hydrocarbons, acids, ketones, ethers, esters, etc., examples of which are hexane, heptane, benzene, toluene, acetic acid, propionic acid, butyric acid, isobutyric acid, pivalic acid, pentanoic acid, octanoic acid, benzoic acid, toluic acid, phthalic acid, decanoic acid, dodecanoic acid, pentadecanoic acid, valeric acid, acetone, methylethyl ketone, diethyl ketone, diisopropyl ketone, ethyl n-butyl ketone, methyl n-amyl ketone, cyclohexanone, diisobutyl ketone, diisopropyl ether, di-n-butyl ether, ethylene glycol diisobutyl ether, methyl o-tolyl ether, ethylene glycol dibutyl ether, diisoamyl ether, methyl p-tolyl ether, methyl m-tolyl ether, diisoamyl ether, methyl acetate, ethyl acetate, n-propyl formate, isopropyl acetate, ethyl propionate, n- propyl acetate, sec-butyl acetate, isobutyl acetate, ethyl n-butyrate, n-butyl acetate, isoamyl acetate, n-amyl acetate, ethylene glycol diacetate, cyclohexyl acetate, diethyl oxalate, isoamyl isovalerate, methyl benzoate and diethyl malonate. It is generally preferable to perform the reaction in an excess of the product carboxylic acid, or in a fatty acid having 2 to 8 carbons, e.g., acetic, propionic, etc.

For ester production, suitable solvents include hydrocarbons, ketones, esters and ethers as exemplified above.

For anhydride production, suitable solvents include any of the aforementioned hydrocarbons, ketones, esters and ethers or an anhydride, e.g., acetic anhydride, propionic anhydride, n-butyric anhydride, undecyclic anhydride, etc. and anhydrides of acids defined hereinabive.

The reaction can also be conducted in the absence of such liquids by performing the reaction in an excess (2-100 times that stoichiometrically required) of the reactant acid, alcohol or water. This can be accomplished for example in the "batch" process, by terminating the reaction prior to most of the reactant acid, alcohol or water being consumed, or for example in the continuous process by adding sufficient acid, alcohol or water to maintain the desired acid, alcohol or water level. The reactions may also be conducted in an excess of the product acid, ester or anhydride.

The invention herein comprises the discovery that the selectivity of the above described complex catalyst in the carbonylation of ethylenically unsaturated hydrocarbons to produce straight chain acids, esters or anhydrides is unexpectedly improved by performing the reaction in the presence of hydrogen and/or with a limited concentration of a mineral acid (particularly a hydrohalic acid such as hydrochloric acid) and/or anion equivalent (i.e., an element or compound which is an anion in aqueous solution which can also be a ligand attached to the Group VIII noble metal, e.g., chloride, bromide, iodide, nitrate, sulfate, etc.).

While not wishing to be bound by any theory as to the mechanism by which the presence of hydrogen or the limited acid and anion equivalent concentration improves the selectivity of the catalyst, it is believed that a form of the most highly selective catalyst is:

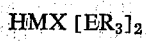
HMX [ER$_3$]$_2$ wherein:

M is the noble metal;
X is an anion equivalent; and
ER$_3$ is as defined hereinabove.

It is believed that any mineral acid, especially a mineral acid comprising an anion equivalent, in the reaction medium in excess of that in the above-preferred catalyst complex can combine with the catalyst in a reversible reaction and form the following undesired intermediate:

H$_2$MX$_2$ [ER$_3$]$_2$

This form, however, is believed to be unstable and decomposes in a reversible reaction with the release of hydrogen to yield the undesired form:

MX$_2$ [ER$_3$]$_2$

It is believed that the presence of hydrogen in the reaction zone inhibits the decomposition of the intermediate catalyst form and hence resists the loss of the selective form of the catalyst. It is also believed that limiting the concentration of the mineral acid and/or anion equivalents inhibits the loss of the active form of the catalyst.

Similarly, when the Group VIII noble metal is supplied to the reaction medium as MX$_2$[ER$_3$]$_2$, hydrogen converts the complex to H$_2$MX$_2$[ER$_3$]$_2$ which upon release of HX forms the selective catalyst HMX[ER$_3$]$_2$. Hence, the above-stated theory is consistent with the fact that hydrogen and an acid absorber, and preferably both, improve the selectivity of the catalyst.

Regardless of the particular mechanism involved, I have found that the aforementioned variables, i.e., presence of hydrogen and/or limited concentrations of acid and/or anion equivalents, have a significant effect on the distribution of products from the reaction.

Accordingly, one aspect of the invention comprises performing the reaction in the presence of hydrogen. This can be achieved by supplying hydrogen (supplied in the form of hydrogen gas or hydrogen-forming agents such as sodium boro hydride, lithium aluminum hydride, lithium hydride, hydrazine, etc.), to the reaction zone to provide a pressure of hydrogen therein from about 1 to 60 atmospheres, preferably 1 to 30 atmospheres. In some applications wherein high conversion is desired lower hydrogen pressures are preferred and hence hydrogen pressures from 1 to about 13 atmospheres, preferably 1 to about 8 atmospheres, are also contemplated.

In another embodiment, the reaction is performed in the presence of limited amounts, or preferably in the complete absence, of a strong mineral acid. The molar amount of such acid in the reaction medium should be maintained at less than 0.5 and preferably less than 0.05 times the molar amount of the Group VIII noble metal. The acid concentration can be controlled below the aforementioned limits by judicious selection of the catalyst components added to the reaction zone or by the addition of an acid acceptor, to be described hereinafter. In a preferred embodiment, the reaction is performed in the presence of hydrogen and in a limited amount of mineral acid.

To aid in controlling the acid concentration, I prefer to perform the reaction in the presence of an acid acceptor which reduces the concentration of reactive acid in the reaction medium and thereby minimizes formation of the aforementioned unstable intermediate form of the catalyst. An acid acceptor which reduces the concentration of reactive acid in the reaction medium and thereby minimizes formation of the aforementioned unstable intermediate form of the catalyst. An acid acceptor is defined herein as a substance which will decrease the content of, or inhibit the formation of, hydrogen ion in the reaction medium (i.e., a compound in a solution to which strong acids may be added without substantially lowering the pH of the solution). Like the addition of a strong reducing agent, it is believed that the acid acceptor aids in maintaining the active form of the complex catalyst. Suitable acid acceptors or buffers include the alkali metal carboxylates, e.g., lithium acetate, sodium propionate, cesium butyrate, potassium acetate, cesium 2-ethylhexanoate, etc. and in general any carboxylate of a fatty acid having 1 to 20 carbons, preferably 2 to 15 carbons, e.g., acetate, propionate, isobutyrate, n-butyrate and valerate. Also an alkali or alkaline earth metal salt of an inorganic oxo, polyfunctional acid such as carbonic, arsenous, arsenic, boric acid is a suitable acid acceptor. Specific examples of these are cesium carbonate, potassium bicarbonate, barium carbonate, calcium carbonate, calcium arsenate, sodium arsenate, potassium borate, lithium arsenate.

The aforementioned acid acceptors, when employed, can be used in concentrations from about 0.01 to 5 weight percent, preferably 0.5 to 2 percent of the reaction medium, in amounts sufficient to lower the acid concentration to below the aforementioned maximum levels. Preferably, the amount of acid acceptor is insufficient to replace all of the preferred halide ligand since in such a case the activity of the catalyst decreases, which results in poor conversion of the reactants. Preferably, therefore, enough acid acceptor, preferably a C$_1$-C$_5$ carboxylate, is added to replace all but one halide but insufficient to replace all the halide ligand. The acid acceptors may be incorporated in the reaction medium as solutions or as slurries or may be added as finely divided solids with a particle size from about 0.001 to about 0.5 inch average particle diameter to insure a sufficient surface area for adequate contacting with the reaction medium and complete adsorption of the acid during the reaction. The acid acceptors are particularly advantageous when carboxylic acids are the solvent and/or the product of the reaction.

In still another embodiment, the reaction is performed in a limited amount of anion equivalent. Preferably, the reaction is conducted in the presence of hydrogen. In order to maintain the selective form of the catalyst, the molar amount of anion equivalent (including that in complex with the Group VIII noble metal) should be maintained from 0.1 to 2.0, preferably from 0.5 to 1.5 times the molar amount of Group VIII noble metal. Generally the anion equivalent, e.g., chloride, is supplied with the source of Group VIII noble metal, e.g., palladium chloride. In such a case the ratio of anion equivalent to palladium may be 2.0, however, the ratio may be decreased if desired by addition of hydrogen which reacts with chloride to form hydrogen chloride which may then be removed from the reaction medium in conventional manner, e.g., ion exchange and/or precipitation means. In general, the amount of anion equivalent may be increased by adding an appropriate salt, e.g., lithium chloride or decreased by known ion exchange and/or precipitation methods, e.g., ion exchanging hydroxyl for chloride, and/or adding silver nitrate to precipitate chloride.

The most preferred mode of practice comprises conducting the carbonylation in the presence of hydrogen and in the presence of an acid acceptor since, as previously mentioned, each encourage the formation of the active form of the complex catalyst and hence the combination better insures that the active form of the catalyst will be maintained. Hence, a preferred carbonylation comprises contacting an olefin carbon monoxide and water, an alcohol or an anhydride with a complex catalyst comprising a Group VIII noble metal and a biphyllic ligand in a hydrogen atmosphere, e.g., 1 to 30 atmospheres, in the presence of an acid acceptor such as an alkali salt of a fatty acid, and in still another preferred embodiment, the reaction is conducted in a hydrogen atmosphere and in a limited amount of mineral acid and anion equivalent, accomplished, for example, by the addition of hydrogen gas, an acid acceptor and means for removing the anion equivalent.

The reaction can be performed at relatively mild temperatures, e.g., temperatures from about 30° to about 300° C., preferably from about 100° to about 200° C. The reaction can be performed at pressures from about 6 to 100 atmospheres, preferably from 20 to 70 atmospheres, sufficient to maintain liquid phase conditions at the reaction temperatures and in addition to improve the rate of reaction by increasing the solubility of the carbon monoxide reactant in the liquid phase.

The reaction can be performed batchwise or in a continuous fashion. When operating batchwise, the catalyst, the acid acceptor, the reaction medium and the olefin (when not a gas at ambient conditions) can be introduced into the reaction zone to form a liquid phase therein and then the reaction zone can be pressured with carbon monoxide and hydrogen and heated to the desired reaction temperature. When the olefin is a gas at ambient conditions, it of course can be added with the carbon monoxide and hydrogen. When performing the reaction in a continuous fashion the reaction medium can be charged to the reaction zone to form a liquid phase therein and the olefin, carbon monoxide and hydrogen can be continuously introduced into the reaction zone to contact the reaction medium containing the catalyst.

The gaseous reactants can be withdrawn as a separate effluent, cooled, depressured and the non-condensibles, chiefly carbon monoxide and hydrogen, can be recycled to further contacting. The liquid product can be withdrawn separately from the reaction zone by withdrawing a stream of the liquid reaction medium contained therein and recovering the desired carboxylic acid, anhydride or ester therefrom by conventional processing such as distillation.

The following examples will further illustrate the practice of the invention and demonstrate the results obtainable thereby:

EXAMPLE 1

This example illustrates the beneficial results obtained by conducting the carbonylation in a reducing atmosphere.

To a ½ gallon stirred autoclave were added ½ gram of palladium chloride, 3 grams triphenylphosphine, 400 milliliters acetic acid, 15 grams water and 80 grams of 1-octene. The autoclave was purged with nitrogen and pressured with carbon monoxide to about 50 atmospheres. The autoclave was then pressured an additional 8 atmospheres with hydrogen. The mixture was heated at 125° C. for 2 hours. The heating was discontinued, the autoclave depressured, and the contents removed and analyzed to reveal that 64 grams of nonanoic acid and 25.9 grams of alpha-methyloctanoic acid were obtained. The ratio of straight chain acid to branched chain acid was thus about 2.5.

The above experiment was repeated except that the carbon monoxide partial pressure was about 25 atmospheres and the hydrogen partial pressure was about 28 atmospheres. There was found 30.8 grams of nonanoic acid and 8.2 grams of alpha-methyloctanoic acid. The ratio of straight chain acid to branched chain acid was thus about 3.8.

EXAMPLE 2

This example illustrates the improved results obtained by the addition of an acid acceptor to the reaction medium.

In a comparative experiment performed in the absence of an acid acceptor, 3 grams palladium chloride, 10 grams triphenylphosphine, 500 milliliters acetic acid, 10 grams water and 80 grams 1-octene were added to a ½ gallon stirred autoclave. The autoclave was pressured with carbon monoxide to a pressure of 42 atmospheres. The autoclave was heated at a temperature of 150° C. for 2 hours. The heat was then removed, the autoclave depressured and the contents removed and analyzed to reveal that 46.0 grams of nonanoic acid and 31.4 grams of alpha-methyloctanoic acid were formed. The ratio of straight chain products to branched chain product was about 1.5.

The above experiment was repeated except that 5 grams of lithium acetate hydrate were added to the reaction medium. It was found that 50.5 grams of nonanoic acid and 31.6 grams of alpha-methyloctanoic acid were formed.. The ratio of straight chain acid to branched chain acid was about 1.6.

The same experiment was repeated except that 20 grams of lithium acetate dihydrate were added to the reaction medium. It was found that 46.3 grams of nonanoic acid and 20.9 grams of alpha-methyloctanoic acid were formed. The ratio of straight chain to branched chain products was about 2.2.

EXAMPLE 3

This example illustrates the improved results obtained by the combination of an acid acceptor and a reducing agent in the carbonylation reaction.

In the first experiment, only the acid acceptor was used. To a ½ gallon stirred autoclave were added ½ gram palladium chloride, 3 grams triphenylphosphine, 400 milliliters acetic acid, 15 grams water, 80 grams 1-octene and 5 grams lithium acetate hydrate. The autoclave was pressured with carbon monoxide to 55 atmospheres and was heated at 125° C. for 2 hours. It was found that 55.4 grams of nonanoic acid and 27.7 grams of alpha-methyloctanoic acid were formed. The ratio of the normal acid to the iso acid was 2.0.

The experiment was repeated except that the autoclave was pressured with 45 atmospheres of hydrogen in addition to the 55 atmospheres of carbon monoxide. It was found that 58.7 grams of nonanoic acid and 19.6 grams of alpha-methyloctanoic acid were formed. The ratio of straight chain acid was about 3.0.

The preceding Examples 1 through 3 illustrate the best mode of practice of the invention presently contemplated.

Other reactants, catalysts and acid acceptors such as those described hereinabove can readily be substituted for those illustrated without substantial changes to the illustrated mode of practice.

I claim:
1. In the carbonylation of ethylenically unsaturated hydrocarbon alpha olefins having 2 to about 25 carbons comprising reacting the hydrocarbon alpha olefin with carbon monoxide and water, an alcohol having 1 to about 18 carbons, or a carboxylic acid having 1 to about 18 carbons in a liquid reaction medium at temperatures between about 30° and 300° C. and at pressures sufficient to maintain liquid phase and in the presence of a Group VIII noble metal catalyst in complex with a biphyllic ligand having the structure:

$$E(R)_3$$

wherein E is trivalent phosphorus, arsenic, antimony or bismuth; and
wherein R is the same or different alkyl, cycloalkyl, or aryl having at most about 18 carbons
the improvement of conducting the carbonylation in the presence of hydrogen sufficient to maintain the catalyst in a form selective for the formation of straight-chained products.

2. The process of claim 1 wherein the partial pressure of hydrogen is 1 to 30 atmospheres.

3. The process of claim 1 wherein the reaction is conducted in the presence of an acid acceptor selected from the group consisting of alkali metal carboxylates having from 1 to 20 carbons and alkali or alkaline earth salts of an inorganic oxo acid selected from the class of carbonic, arsenous, arsenic and boric acids.

4. The process of claim 3 wherein the acid acceptor is an alkali metal carboxylate having 2 to about 20 carbons.

5. The process of claim 3 wherein the hydrogen partial pressure is 1 to 30 atmospheres and the acid acceptor is an alkali metal carboxylate having 2 to about 20 carbons.

6. The process of claim 1 wherein the biphyllic ligand is a triarylphosphine whose aryl radicals have 6 to about 9 carbons.

7. The process of claim 6 wherein the Group VIII noble metal is palladium and wherein the triarylphosphine is triphenylphosphine.

8. The process of claim 6 wherein the Group VIII noble metal is also in complex with halide.

9. The process of claim 4 wherein the amount of alkali metal carboxylate is sufficient to lower the acid level to below 0.5 times the molar amount of Group VIII noble metal and insufficient to replace all the halide ligand.

10. In the carbonylation of an ethylenically unsaturated hydrocarbon alpha olefin having 2 to about 25 carbons comprising reacting the hydrocarbon alpha olefin with carbon monoxide and water, an alcohol having from 1 to about 18 carbons, or a carboxylic acid having from 1 to about 18 carbons in a liquid reaction medium at a temperature between about 30° and 300° C. and at a pressure sufficient to maintain liquid phase and in the presence of a Group VIII noble metal catalyst in complex association with a biphyllic ligand having the structure:

$$E(R)_3$$

wherein E is trivalent phosphorus, arsenic, antimony or bismuth; and
wherein R is the same or different alkyl, cycloalkyl, or aryl having at most about 18 carbons,
the improvement of conducting the carbonylation in the presence of hydrogen and maintaining a mineral acid in said reaction medium at a concentration less than 0.5 times the molar quantity of the Group VIII noble metal and sufficient to maintain the catalyst in a form selected for the formation of straight-chained products.

11. The process of claim 10 wherein the Group VIII noble metal is palladium, the biphyllic ligand is triphenylphosphine.

12. The process of claim 10 wherein the Group VIII noble metal catalyst complex includes a halide ligand.

13. The process of claim 10 wherein the reaction medium includes hydrogen at a partial pressure of 1 to 30 atmospheres.

References Cited

UNITED STATES PATENTS

| | | | |
|---|---|---|---|
| 3,064,040 | 11/1962 | Klemchuk | 260—514 |
| 3,168,553 | 2/1965 | Slaugh | 260—497 |
| 3,253,018 | 5/1966 | Zachry et al. | 260—483 |
| 3,455,989 | 7/1969 | Kutepow et al. | 260—468 |
| 3,505,394 | 4/1970 | Olivier | 260—497 |

LEWIS GOTTS, Primary Examiner

E. G. LOVE, Assistant Examiner

U.S. Cl. X.R.

260—413, 514 CO, 533, 546